Dec. 5, 1933.    F. S. TUCKER    1,938,266
FISHING SPOON
Filed Aug. 27, 1929
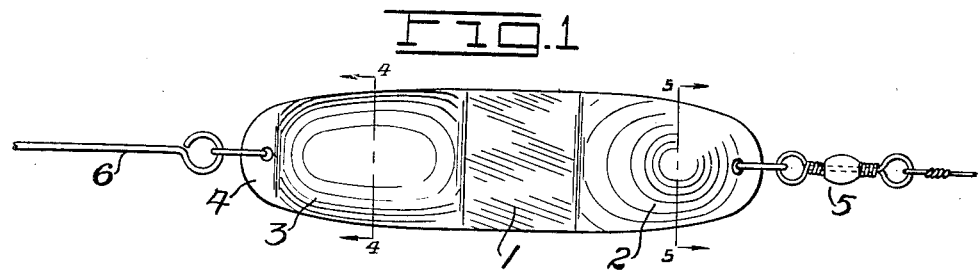
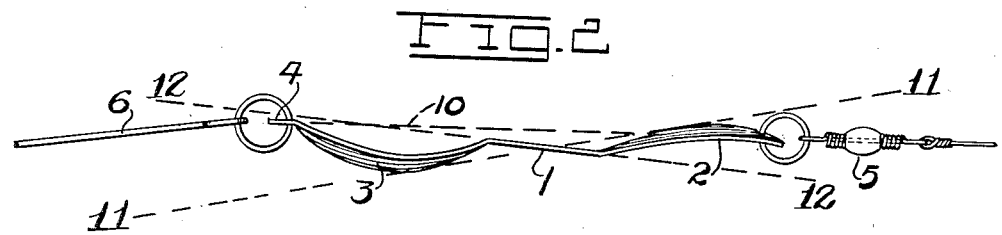
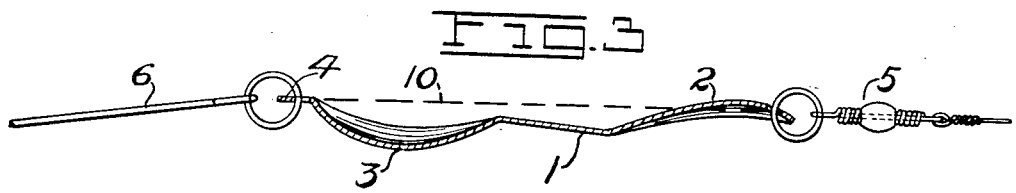
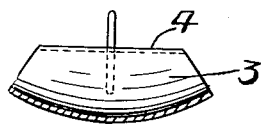 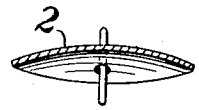
Inventor
Frank S. Tucker
By Henry L. Reynolds
His Attorney Patented Dec. 5, 1933

1,938,266

UNITED STATES PATENT OFFICE 1,938,266

FISHING SPOON

Frank S. Tucker, Seattle, Wash.

Application August 27, 1929. Serial No. 388,685

4 Claims. (Cl. 43—45)

My invention relates to what is commonly referred to as fishing spoons, that is, metal lures which by their movement through the water are given movements suggestive or imitative of the movements of the smaller fishes which are used as food by the fish being sought.

The object of my invention is to produce such a spoon, which will be efficient in its luring and catching qualities and at the same time of simple and cheaply made design.

The body of my spoon consists of a metal plate, having a central plane section which is approximately of the form of a square and end sections of reversely facing spoon shapes, one end terminating in a flat ear or flange which is a plane and is provided with means for securing a hook thereto.

In the accompanying drawing I have shown a spoon constructed in accordance with my ideas. It is to be understood that a reasonable departure from the exact dimensions and relation of the parts may be permitted within the scope of my invention.

Figure 1 is a face view of a spoon.

Figure 2 is an edge view.

Figure 3 is a central longitudinal section.

Figure 4 is a transverse section taken on the plane indicated by the line 4—4 of Figure 1.

Figure 5 is a transverse section taken on the plane indicated by the line 5—5 of Figure 1.

The spoon which is the subject of the present invention, has been produced, primarily for taking salmon, but is of course adapted for the taking of other fish. Such spoons are commonly made of bright metal, to thereby reflect light and thus afford a maximum visibility to the fish being sought.

This spoon has a central section 1 which is a plane and has substantially equal sides, two of which are the side margins of the spoon. As illustrated, the transversely placed sides of the square are very slightly longer than those sides which lie in the side edges of the spoon.

At the ends of the spoon are the oppositely facing spoon sections 2 and 3, of which the forward spoon 2 may be of slightly less length than the rear spoon section 3. In width and in shape they are substantially alike, except as the rear spoon is modified by the flat ear 4, to which the hook 6 is attached. A swivel 5, or other suitable means for attachment to a line, is secured to the forward section 2.

The shape of the spoon as viewed edgewise, as in Figures 2 and 3, is such that the central plane 1 is laterally offset from a straight line 10, drawn between the points of connection of line and hook, this being at the side towards which the concave side of the spoon 2 faces.

Referring to Fig. 2, it will be noted that a straight line 11 drawn through the convex faces of the cupped ends 2 and 3, intersects the connecting or central part 1, at substantially the transverse center of the latter, and that a straight line 12 drawn longitudinally through the central part 1 is in register with the extremities of the cupped end 3, and that the outer or free extremity of the cupped end 2, is spaced from this line 12. This disposition of the parts brings same into such relation so that the spoon oscillations are in a somewhat half-circle with lateral darts occurring at varying intervals.

This plane is also preferably slightly inclined to said line 10, the forward edge of the plane being farther removed from this line than its rear edge.

I have found by use that this spoon is highly attractive to fish. With it high catches have been obtained, comparable very favorably with results of the use of other spoons.

In use the spoon oscillates through perhaps half a circle, its path being in the upper surface of a cylinder having its axis parallel with the line of forward movement. This path is varied by occasional and irregularly timed lateral darts. Its movement is characteristically different from that of other spoons.

What I claim as my invention is:

1. A fishing spoon composed of a body having a central flat section and reversely cupped ends connected to the ends of the central section, said central section being disposed at an angle to the cupped ends so that the cupped end to which the hook is attached will have its extremities substantially in register with a line drawn longitudinally through the central section and so that the other cupped end will have its free extremity to which the fishing line is attached disposed at a distance spaced from said drawn line.

2. A fishing spoon composed of a body having a central flat section, reversely cupped ends connected to the ends of said central section, said cupped ends being disposed at such angles to the central section so that a line drawn through the convex faces of the cupped ends will intersect the central section at substantially the transverse center of the latter.

3. A fishing spoon composed of a body having a central flat section and reversely cupped ends connected to the ends of the central section, said central section being disposed at an angle to the cupped ends so that the cupped end to which the hook is attached will have its extremities substantially in register with a line drawn longitudinally through the central section and so that the other cupped end will have its free extremity to which the fishing line is attached disposed at a distance spaced from said drawn line and a hook attaching ear extending outwardly from the rear cupped end and disposed substantially in register with said drawn line.

4. A fishing spoon composed of a body having a central flat section and reversely cupped ends connected to the ends of the central section, said central section being disposed at an angle and to one side of a line drawn between the points of connection of the fishing line and hook, and means to attach a fishing line to one of the cupped ends, said one of the cupped ends being disposed to one side of said drawn line and the central section extending downwardly at an incline to the other cupped end.

FRANK S. TUCKER.